(12) United States Patent
Chuang

(10) Patent No.: US 11,661,132 B2
(45) Date of Patent: May 30, 2023

(54) AUXILIARY FIXING DEVICE FOR A BICYCLE

(71) Applicant: Louis Chuang, Taichung (TW)

(72) Inventor: Louis Chuang, Taichung (TW)

( * ) Notice: Subject to any disclaimer, the term of this patent is extended or adjusted under 35 U.S.C. 154(b) by 0 days.

(21) Appl. No.: 17/484,383

(22) Filed: Sep. 24, 2021

(65) Prior Publication Data

US 2022/0144364 A1 May 12, 2022

(30) Foreign Application Priority Data

Nov. 12, 2020 (TW) .................... 109139547

(51) Int. Cl.
*B62J 9/26* (2020.01)
*B62J 9/27* (2020.01)

(52) U.S. Cl.
CPC .. *B62J 9/27* (2020.02); *B62J 9/26* (2020.02)

(58) Field of Classification Search
CPC ......... B62J 9/26; B62J 9/27; B62J 7/04; B62J 11/00; B62J 9/23
USPC ........................................ 224/247
See application file for complete search history.

(56) References Cited

U.S. PATENT DOCUMENTS

| | | | |
|---|---|---|---|
| 3,172,584 A * | 3/1965 | Cohen | B60R 7/084 224/547 |
| 4,566,617 A * | 1/1986 | Jackson | B62J 9/26 224/427 |
| 5,127,563 A * | 7/1992 | Chan | B62J 9/26 224/438 |
| 5,190,345 A * | 3/1993 | Lin | B62J 9/26 224/427 |
| 5,474,270 A * | 12/1995 | Rixen | B62J 9/26 248/221.11 |
| 5,655,694 A * | 8/1997 | Keckeisen | B62J 9/26 224/430 |
| 6,398,247 B1 * | 6/2002 | Kuo | B62J 7/04 224/427 |
| 7,225,956 B2 | 6/2007 | Lien et al. | |
| 7,654,550 B2 * | 2/2010 | Chuang | B62J 9/27 224/427 |
| 10,604,204 B2 | 3/2020 | Chee | |

(Continued)

FOREIGN PATENT DOCUMENTS

| | | |
|---|---|---|
| CN | 2728888 Y | 9/2005 |
| DE | 20109775 U1 * | 11/2001 |
| DE | 102018008392 A1 | 4/2020 |

(Continued)

*Primary Examiner* — Adam J Waggenspack
(74) *Attorney, Agent, or Firm* — Alan D. Kamrath; Karin L. Williams; Mayer & Williams PC

(57) ABSTRACT

An auxiliary fixing device for a bicycle includes a body and a supporting rod unit. The supporting rod unit includes first and second supporting rods coupled to the body. Each of the first and second supporting rods includes a connecting portion, a supporting portion, and an extension portion between the connecting portion and the supporting portion. The extension portion of the first supporting rod has an end adjacent to the connecting portion of the first supporting rod and another end extending away from the second supporting rod. The extension portion of the second supporting rod has an end adjacent to the connecting portion of the second supporting rod and another end extending away from the first supporting rod.

6 Claims, 12 Drawing Sheets

(56) References Cited

U.S. PATENT DOCUMENTS

2006/0043132 A1    3/2006   Lien et al.
2019/0100266 A1    4/2019   Chee

FOREIGN PATENT DOCUMENTS

| EP | 2366613 A1 | | 9/2011 |
|----|------------|---|--------|
| SE | 508509 C3 | * | 8/1998 |
| TW | M354555 U | | 4/2009 |
| TW | M365304 U | | 9/2009 |
| TW | M578667 U | | 6/2019 |
| WO | WO-0238436 | * | 5/2002 |

* cited by examiner

AUXILIARY FIXING DEVICE FOR A BICYCLE

BACKGROUND OF THE INVENTION

The present invention relates to a fixing device and, more particularly, to an auxiliary fixing device for a bicycle.

Taiwan Utility Model No. M578667 discloses a saddle bag to be mounted to a bicycle having a saddle unit. The saddle unit includes a saddle for riding and two mounting rods extending below the saddle and spaced from each other in a lateral direction. The saddle bag includes two housings and a closure unit. Each housing includes a sidewall, a connecting wall extending from a periphery of the sidewall towards the other housing, and a protrusion protruding outwards from the sidewall. The sidewalls and the connecting walls together define a receiving space. The closure is disposed between the connecting walls for separably connecting the connecting walls. The protrusions are inserted between the saddle and the two mounting rods and abut against the two mounting rods, respectively. Thus, the saddle bag can be securely disposed below the saddle bag.

In comparison with conventional saddlebags using straps, the above-mentioned saddle bag includes the protrusions for positioning the saddle bag through rigid abutting. However, the protrusions are located on edges of the saddle bag. When the saddle bag is relatively long and, thus, protrudes rearwards, the saddle bag could wobble in the lateral direction during cycling.

In view of the above drawbacks in the conventional structure, a need exists for a bicycle auxiliary fixing device overcoming the drawbacks.

BRIEF SUMMARY OF THE INVENTION

An objective of the present invention is to provide a bicycle auxiliary fixing device including a body and a supporting rod unit. The supporting rod unit includes a first supporting rod and a second supporting rod. The first supporting rod includes a first connecting portion, a first supporting portion, and a first extension portion. The first connecting portion is coupled to the body. The first extension portion is located between the first connecting portion and the first supporting portion. The second supporting rod includes a second connecting portion, a second supporting portion, and a second extension portion. The second connecting portion is coupled to the body. The second extension portion is located between the second connecting portion and the second supporting portion. An end of the first extension portion is adjacent to the first connecting portion. Another end of the first extension portion extends away from the second supporting rod. An end of the second extension portion is adjacent to the second connecting portion. Another end of the second extension portion extends away from the first supporting rod.

In an example, the body includes a base and a connecting member. The base includes an end having a sliding groove. The connecting member includes a sliding portion on a side thereof and first and second insertion holes extending therethrough. The sliding portion is inserted into the sliding groove. The first connecting portion is inserted into the first insertion hole. The second connecting portion is inserted into the second insertion hole.

In an example, each of the first connecting portion and the first insertion hole includes non-circular cross sections. The first supporting rod is not rotatable relative to the connecting member. A first fastener is disposed to the first supporting rod and is secured to an end of the first connecting portion. The first fastener and the first extension portion are disposed on two opposite sides of the connecting member. Each of the second connecting portion and the second insertion hole includes non-circular cross sections. The second supporting rod is not rotatable relative to the connecting member. A second fastener is disposed to the second supporting rod and is secured to an end of the second connecting portion. The second fastener and the second extension portion are disposed on two opposite sides of the connecting member.

In an example, the base includes a lateral hole extending in a radial direction of the sliding groove. The lateral hole intercommunicates with the sliding groove. A threaded member is mounted in the lateral hole. The sliding portion includes a threaded aperture. The threaded member is threadedly inserted into the threaded aperture.

In an example, the first supporting portion includes a first section, a second section, and a first bend section. The first section is adjacent to the first extension portion. The first bend section is disposed between the first section and the second section. The second supporting portion includes a third section, a fourth section, and a second bend section. The third section is adjacent to the second extension portion. The second bend section is disposed between the third section and the fourth section. The first section and the third section have a spacing therebetween that increases with increasing distance from the body. The second section is parallel to the fourth section.

In an example, the first connecting portion is parallel to the second connecting portion. The first connecting portion and the first extension portion have a bend therebetween and extend in different directions. The second connecting portion and the second extension portion have a bend therebetween and extend in different directions.

In an example, the body includes a saddle frame clamping block mounted to an end of the base opposite to the supporting rod unit. The end of the base opposite to the supporting rod unit includes two first grooves through which a saddle frame extends. The saddle frame clamping block includes two second grooves through which the saddle frame extends and aligned with the two first grooves, respectively. The sliding groove includes an inner periphery having T-shaped cross sections. The sliding portion includes an outer periphery having T-shaped cross sections.

In an example, the fixing device includes a top clamping board fixed to a side of the connecting member opposite to the base by a plurality of top fasteners. The plurality of top fasteners extends through the top clamping board from a side of the top clamping board opposite to the connecting member and is in threading connection with the connecting member.

In an example, the fixing device includes a first side clamping board and a second side clamping board. The first side clamping board is fixed by a plurality of first side fasteners to a side of the second section adjacent to the fourth section. The second side clamping board is fixed by a plurality of second side fasteners to a side of the fourth section adjacent to the second section.

In an example, the plurality of top fasteners extends through the top clamping board from a side of the top clamping board opposite to the connecting member and is in threading connection with the connecting member. The plurality of first side fasteners extends through the first side clamping board from a side of the first side clamping board opposite to the second section and is in threading connection with the second section. The plurality of second side fasteners extends through the second side clamping board from a side of the second side clamping board opposite to the fourth section and is in threading connection with the fourth section.

The present invention will become clearer in light of the following detailed description of illustrative embodiments of this invention described in connection with the drawings.

DETAILED DESCRIPTION OF THE INVENTION

Figure 1:
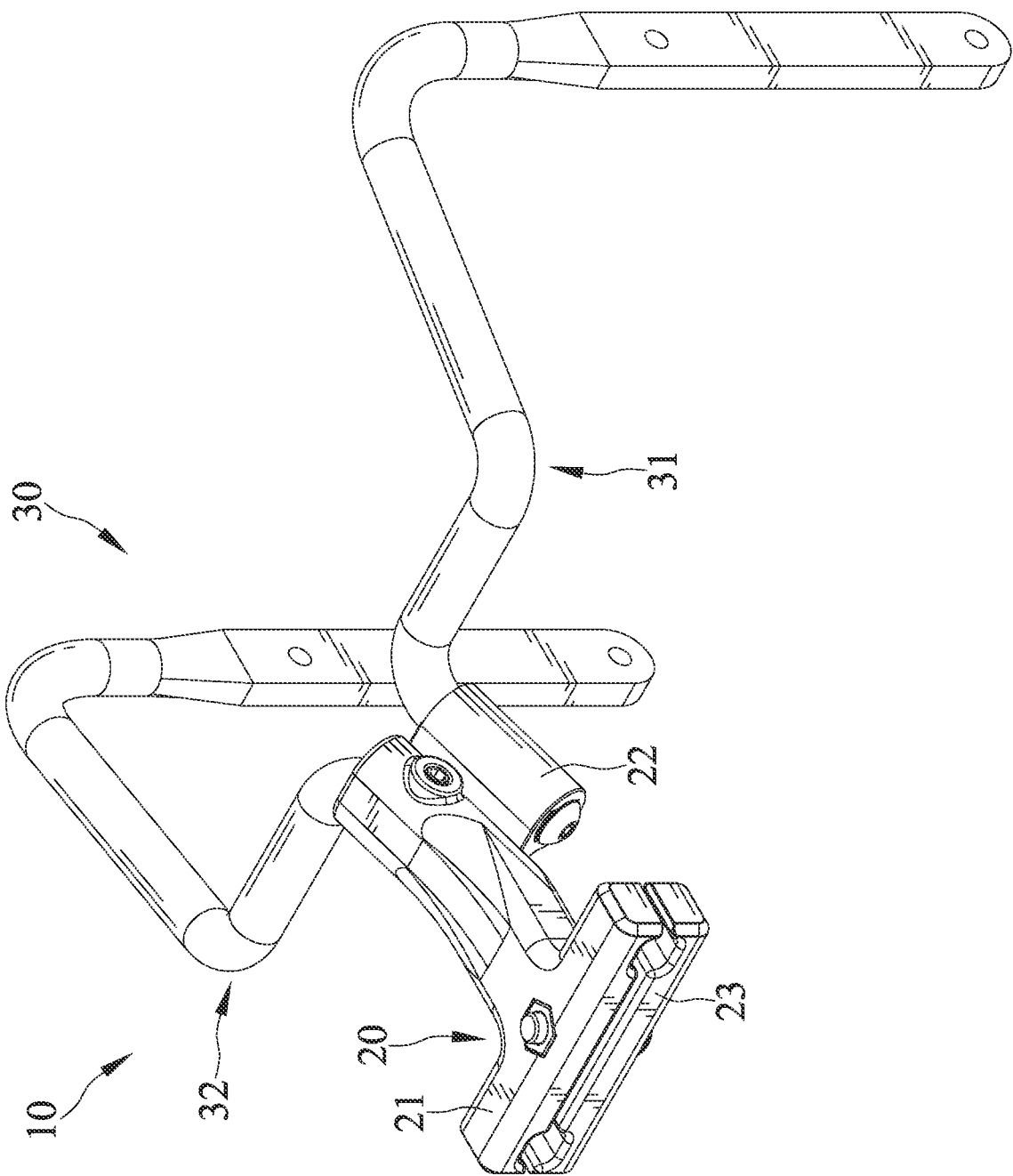
FIG. 1 is a perspective view of an auxiliary fixing device for a bicycle of a first embodiment according to the present invention.
Figure 2:
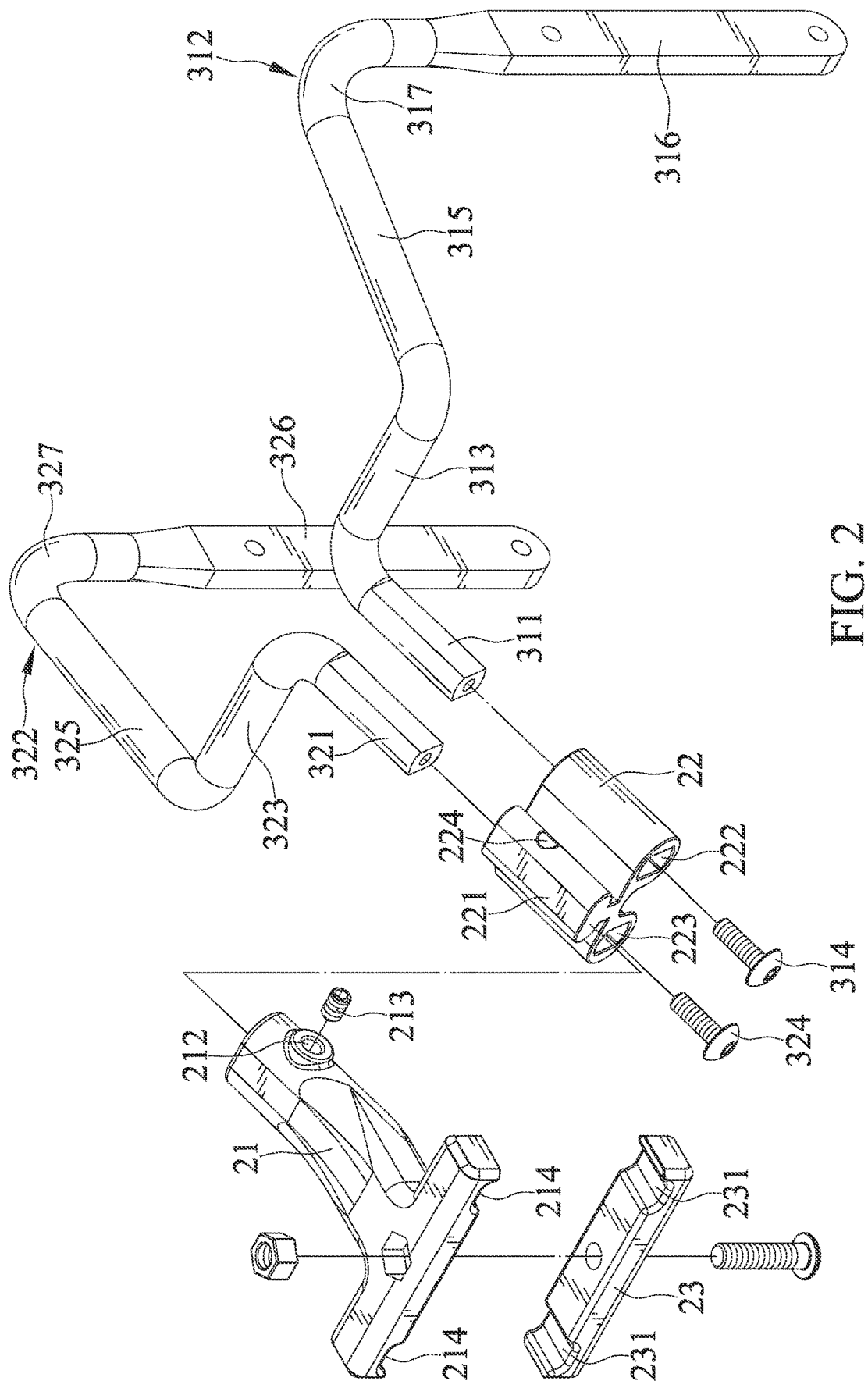
FIG. 2 is an exploded, perspective view of the auxiliary fixing device of the first embodiment according to the present invention.
Figure 3:
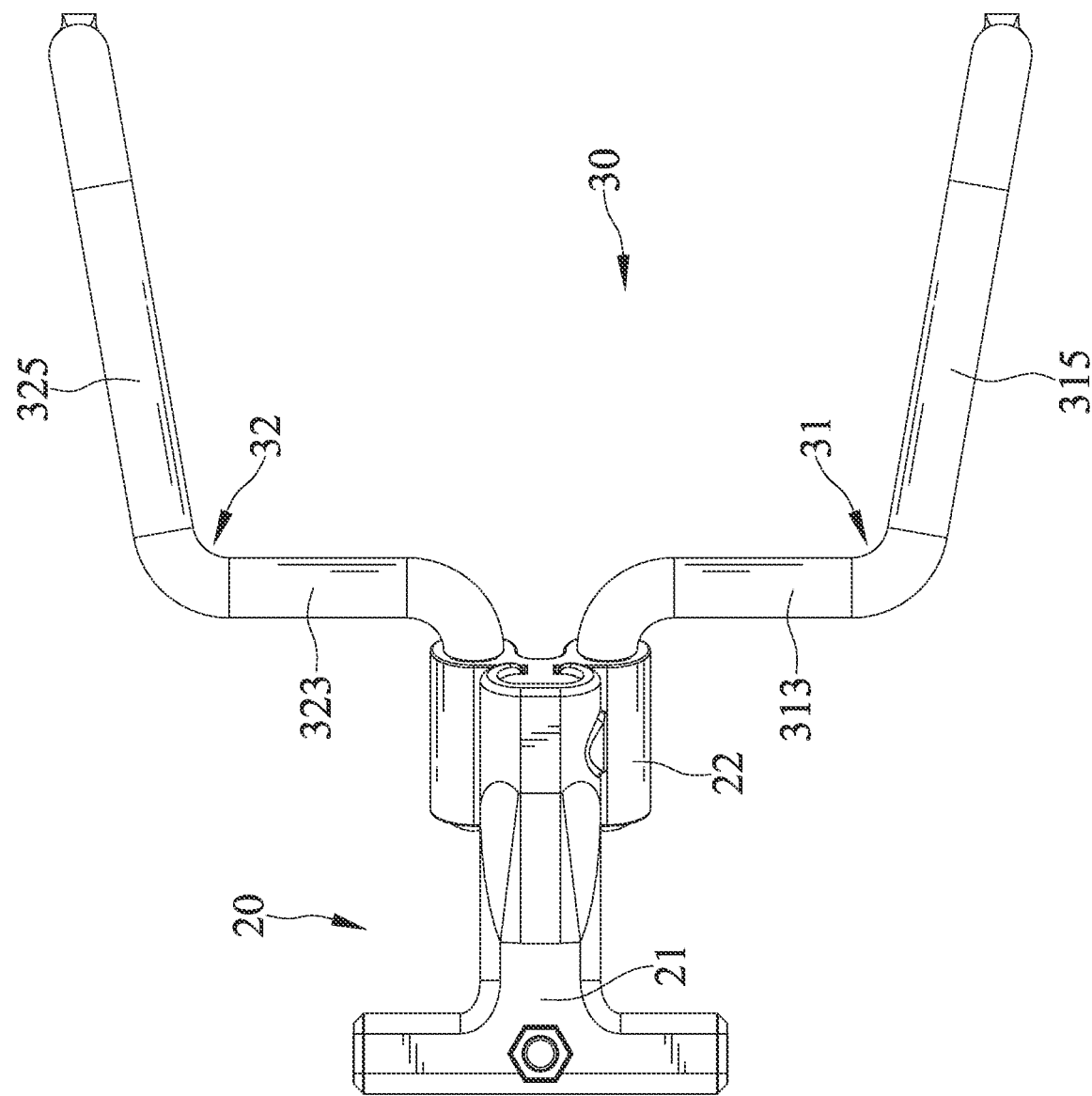
FIG. 3 is a plan view of the auxiliary fixing device of the first embodiment according to the present invention.
Figure 4:
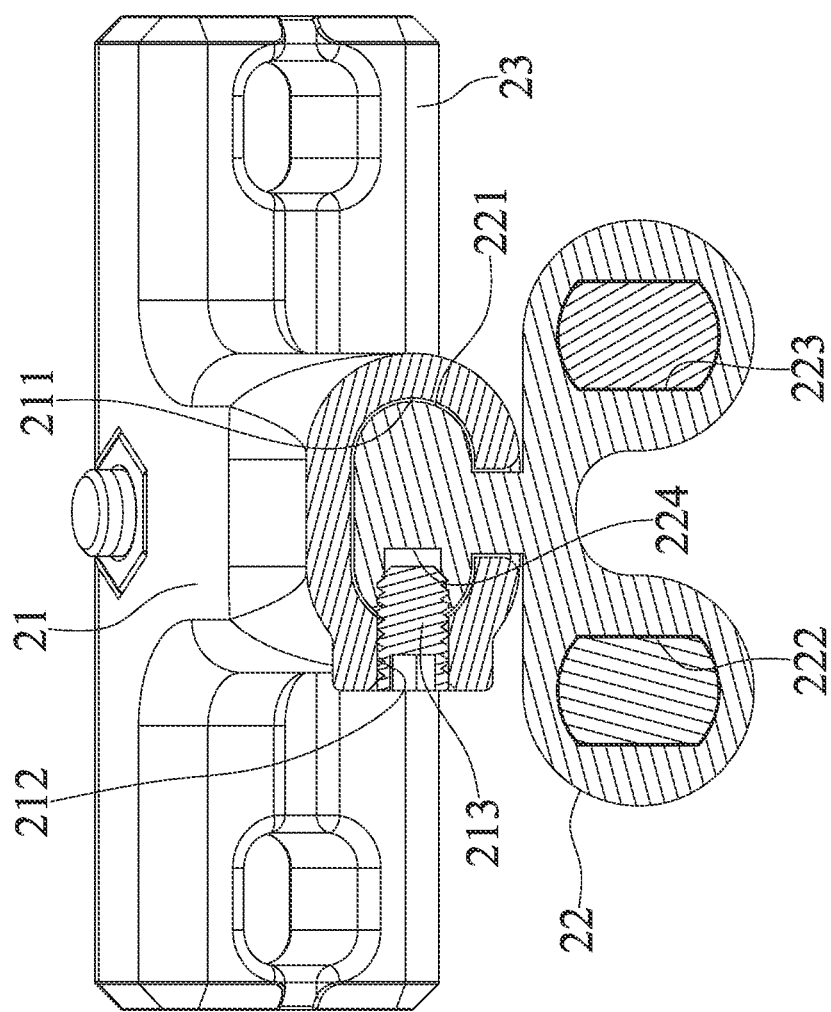
FIG. 4 is a cross sectional view of the auxiliary fixing device of the first embodiment according to the present invention.

With reference to FIGS. 1-4, an auxiliary fixing device for a bicycle of a first embodiment according to the present invention comprises a body 20 and a supporting rod unit 30.

The supporting rod unit 30 includes a first supporting rod 31 and a second supporting rod 32. The first supporting rod 31 includes a first connecting portion 311, a first supporting portion 312, and a first extension portion 313. The first connecting portion 311 is coupled to the body 20. The first extension portion 313 is located between the first connecting portion 311 and the first supporting portion 312. The second supporting rod 32 includes a second connecting portion 321, a second supporting portion 322, and a second extension portion 323. The second connecting portion 321 is coupled to the body 20. The second extension portion 323 is located between the second connecting portion 321 and the second supporting portion 322.

An end of the first extension portion 313 is adjacent to the first connecting portion 311. Another end of the first extension portion 313 extends away from the second supporting rod 32. An end of the second extension portion 323 is adjacent to the second connecting portion 321. Another end of the second extension portion 323 extends away from the first supporting rod 31.

The body 20 includes a base 21 and a connecting member 22. The base 21 includes an end having a sliding groove 211. The connecting member 22 includes a sliding portion 221 on a side thereof and first and second insertion holes 222 and 223 extending therethrough. The sliding portion 221 is inserted into the sliding groove 211. The first connecting portion 311 is inserted into the first insertion hole 222. The second connecting portion 321 is inserted into the second insertion hole 223.

Each of the first connecting portion 311 and the first insertion hole 222 includes non-circular cross sections. The first supporting rod 31 is not rotatable relative to the connecting member 22. A first fastener 314 is disposed to the first supporting rod 31 and is secured to an end of the first connecting portion 311. The first fastener 314 and the first extension portion 313 are disposed on two opposite sides of the connecting member 22. Each of the second connecting portion 321 and the second insertion hole 223 includes non-circular cross sections. The second supporting rod 32 is not rotatable relative to the connecting member 22. A second fastener 324 is disposed to the second supporting rod 32 and is secured to an end of the second connecting portion 321. The second fastener 324 and the second extension portion 323 are disposed on two opposite sides of the connecting member 22.

The base 21 includes a lateral hole 212 extending in a radial direction of the sliding groove 211. The lateral hole 212 intercommunicates with the sliding groove 211. A threaded member 213 is mounted in the lateral hole 212. The sliding portion 221 includes a threaded aperture 224. The threaded member 213 is threadedly inserted into the threaded aperture 224.

The first supporting portion 312 includes a first section 315, a second section 316, and a first bend section 317. The first section 315 is adjacent to the first extension portion 313. The first bend section 317 is disposed between the first section 315 and the second section 316. The second supporting portion 322 includes a third section 325, a fourth section 326, and a second bend section 327. The third section 325 is adjacent to the second extension portion 323. The second bend section 327 is disposed between the third section 325 and the fourth section 326. The first section 315 and the third section 325 have a spacing therebetween that increases with increasing distance from the body 20. The second section 316 is parallel to the fourth section 326.

The first connecting portion 311 is parallel to the second connecting portion 321. The first connecting portion 311 and the first extension portion 313 have a bend therebetween and extend in different directions. The second connecting portion 321 and the second extension portion 323 have a bend therebetween and extend in different directions.

The body 20 includes a saddle frame clamping block 23 for clamping a saddle frame. The saddle frame clamping block 23 is mounted to an end of the base 21 opposite to the supporting rod unit 30. The end of the base 21 opposite to the supporting rod unit 30 includes two first grooves 214 through which the saddle frame extends. The saddle frame clamping block 23 includes two second grooves 231 through which the saddle frame extends and aligned with the two first grooves 214, respectively.

The sliding groove 211 includes an inner periphery having T-shaped cross sections. The sliding portion 221 includes an outer periphery having T-shaped cross sections.

Figure 5:
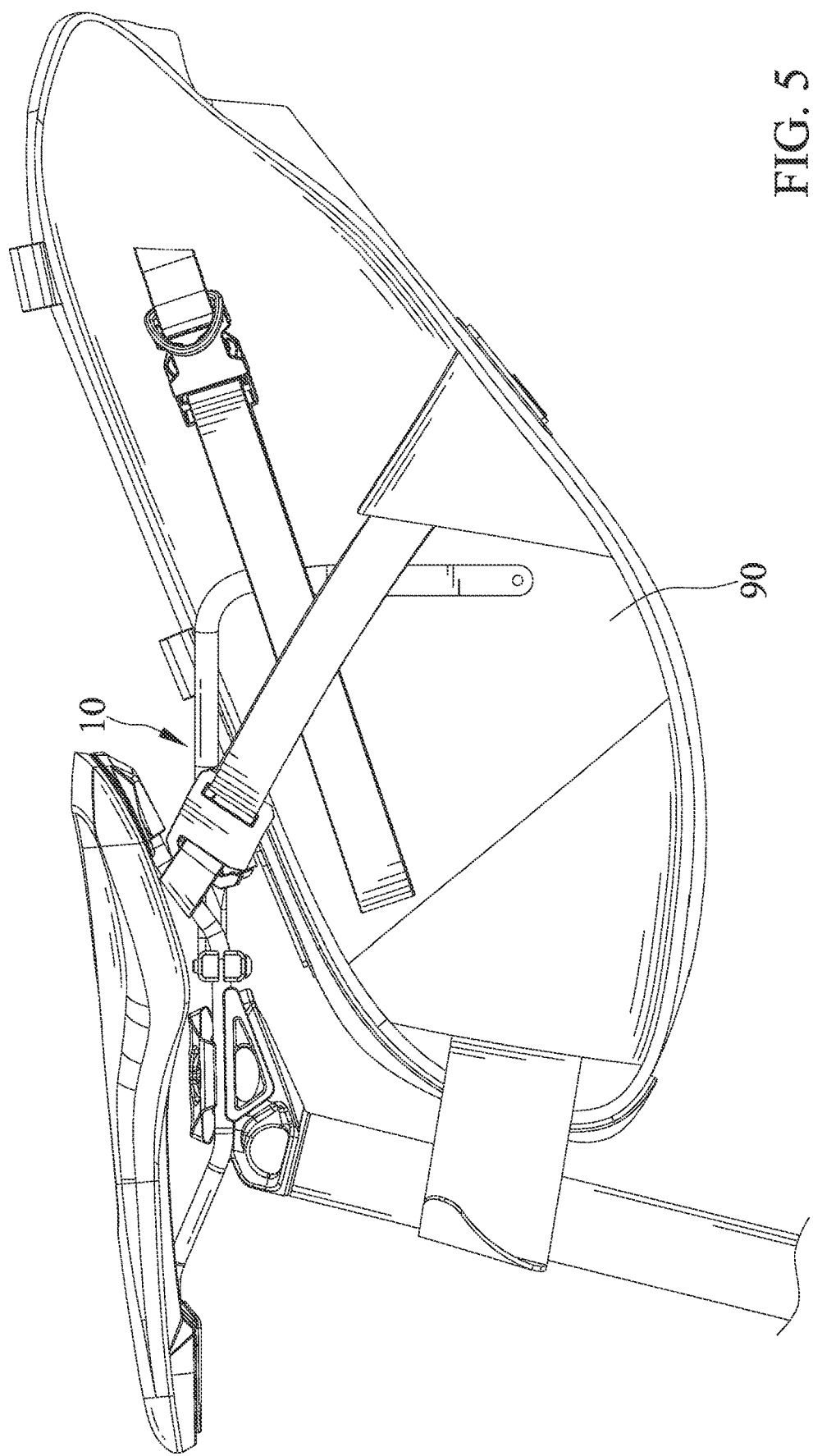
FIG. 5 is a diagrammatic view illustrating use of the auxiliary fixing device of the first embodiment according to the present invention on a bicycle.

FIG. 5 shows use of the auxiliary fixing device of the first embodiment according to the present invention on a bicycle. By the above structure, the fixing device 10 can provide a securing effect for a saddle bag 90, avoiding the saddle bag 90 from wobbling leftwards and rightwards during cycling.

Figure 6:
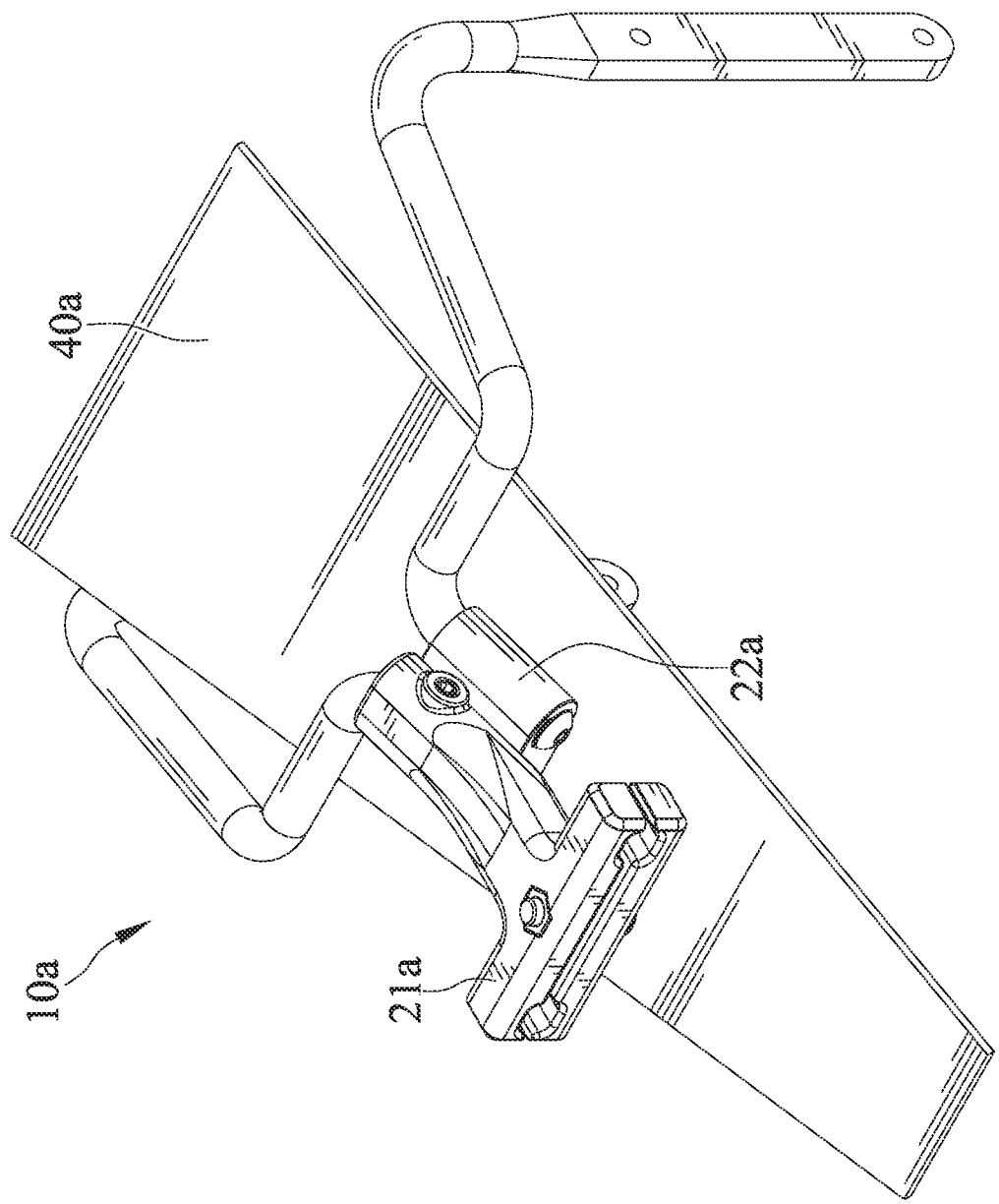
FIG. 6 is a perspective view of an auxiliary fixing device for a bicycle of a second embodiment according to the present invention.
Figure 7:
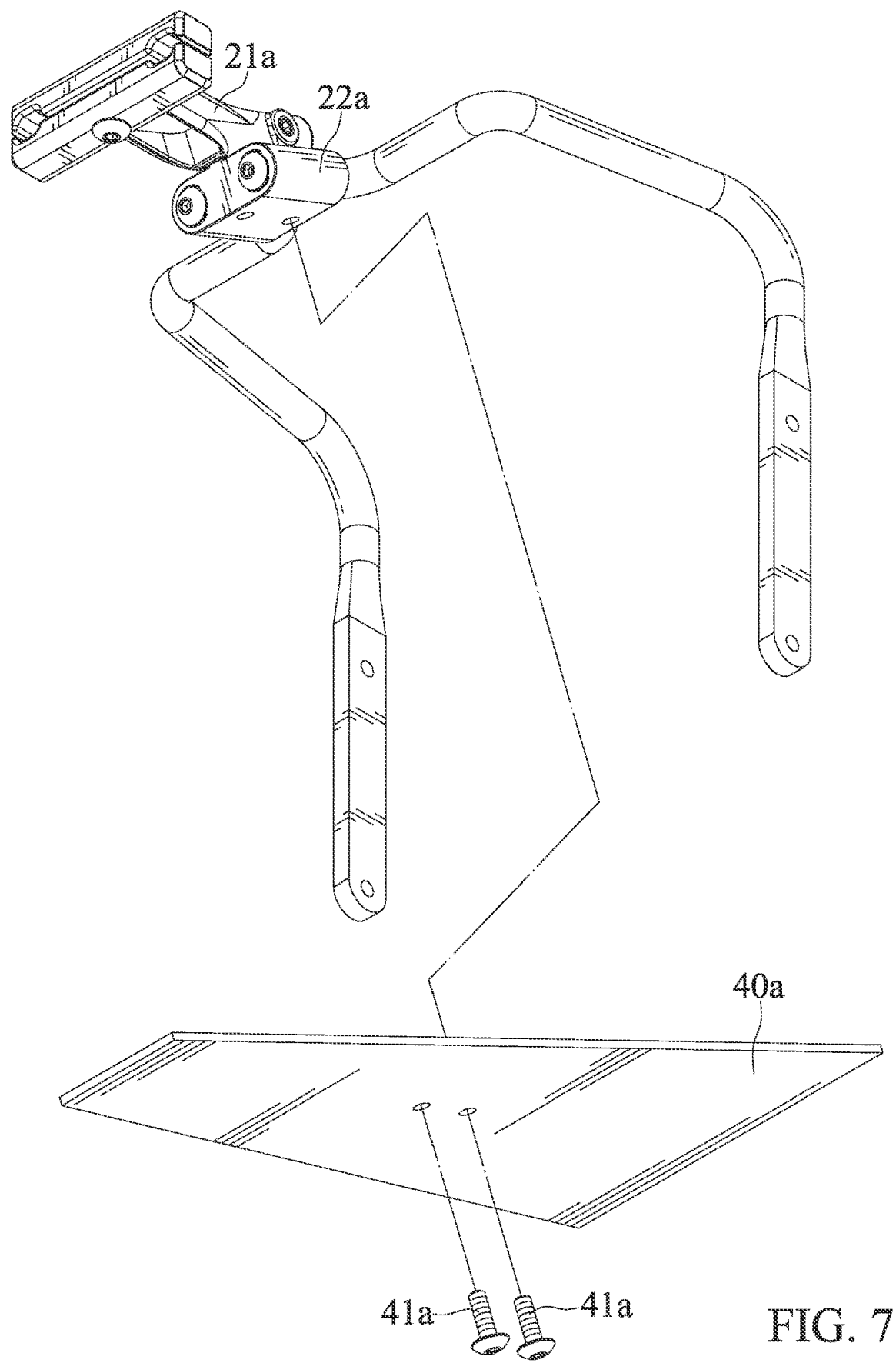
FIG. 7 a partly-exploded perspective view of the auxiliary device of the second embodiment according to the present invention.
Figure 8:
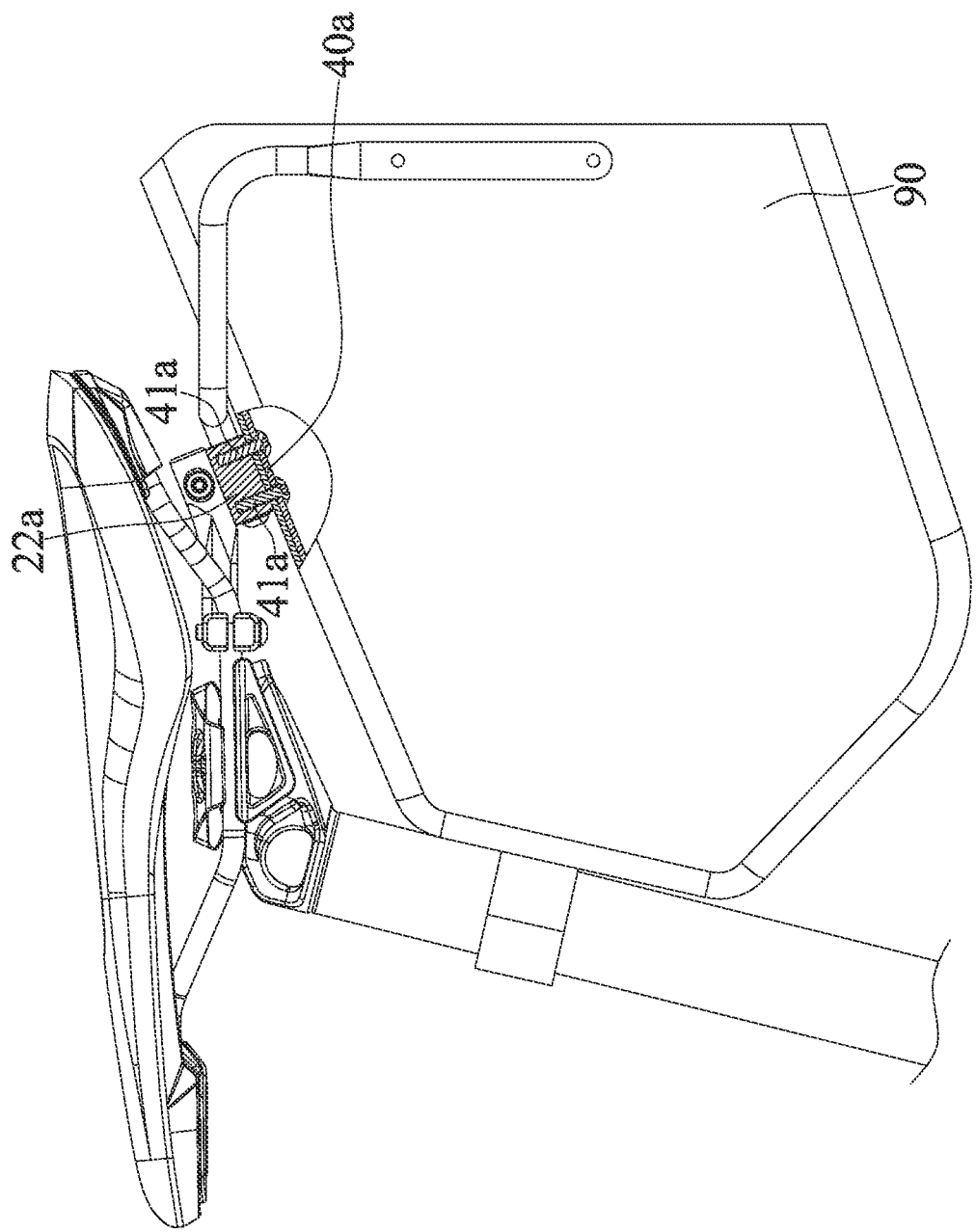
FIG. 8 is a diagrammatic view illustrating use of the auxiliary fixing device of the second embodiment according to the present invention on a bicycle.
Figure 9:
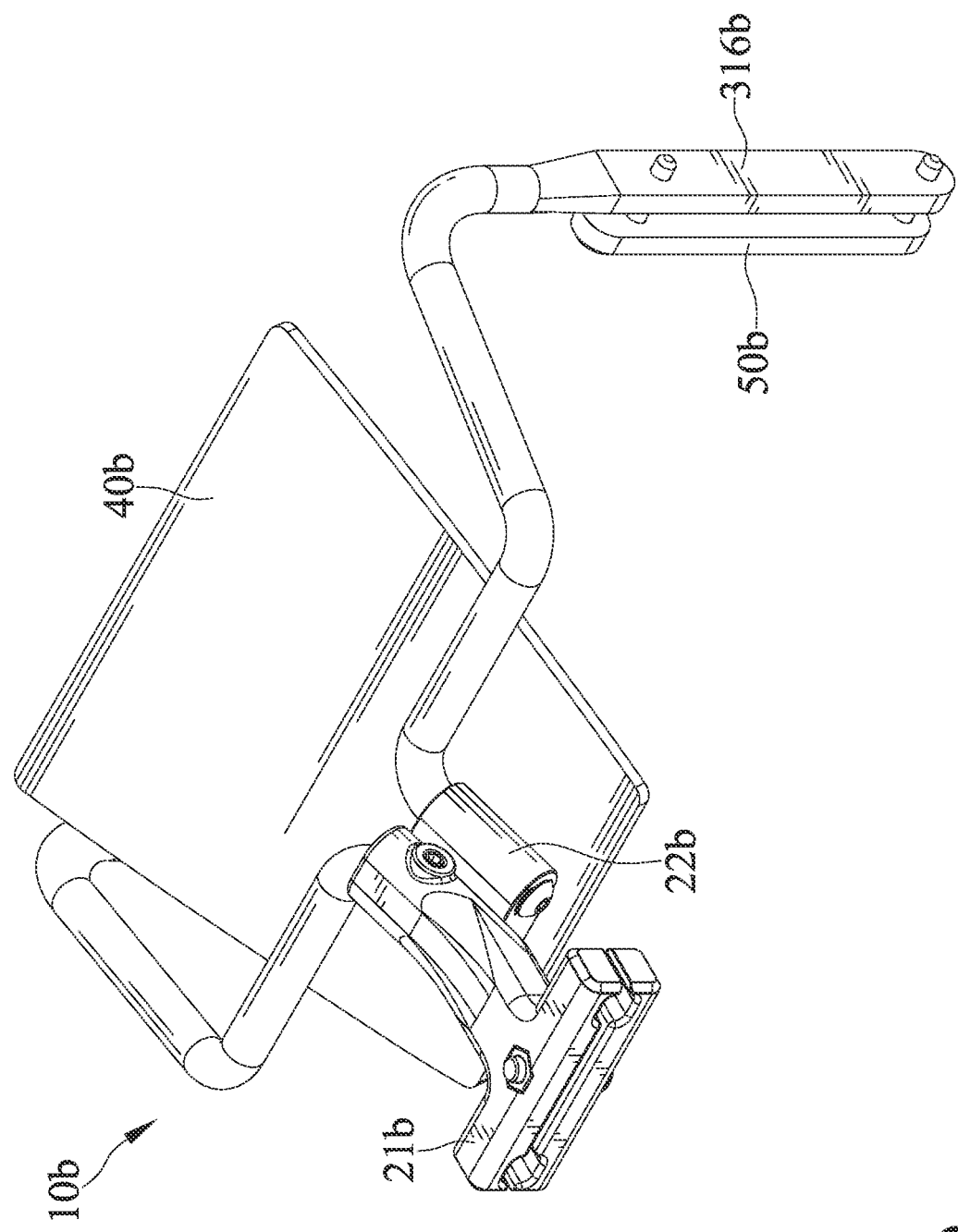
FIG. 9 is perspective view of an auxiliary fixing device for a bicycle of a third embodiment according to the present invention.
Figure 10:
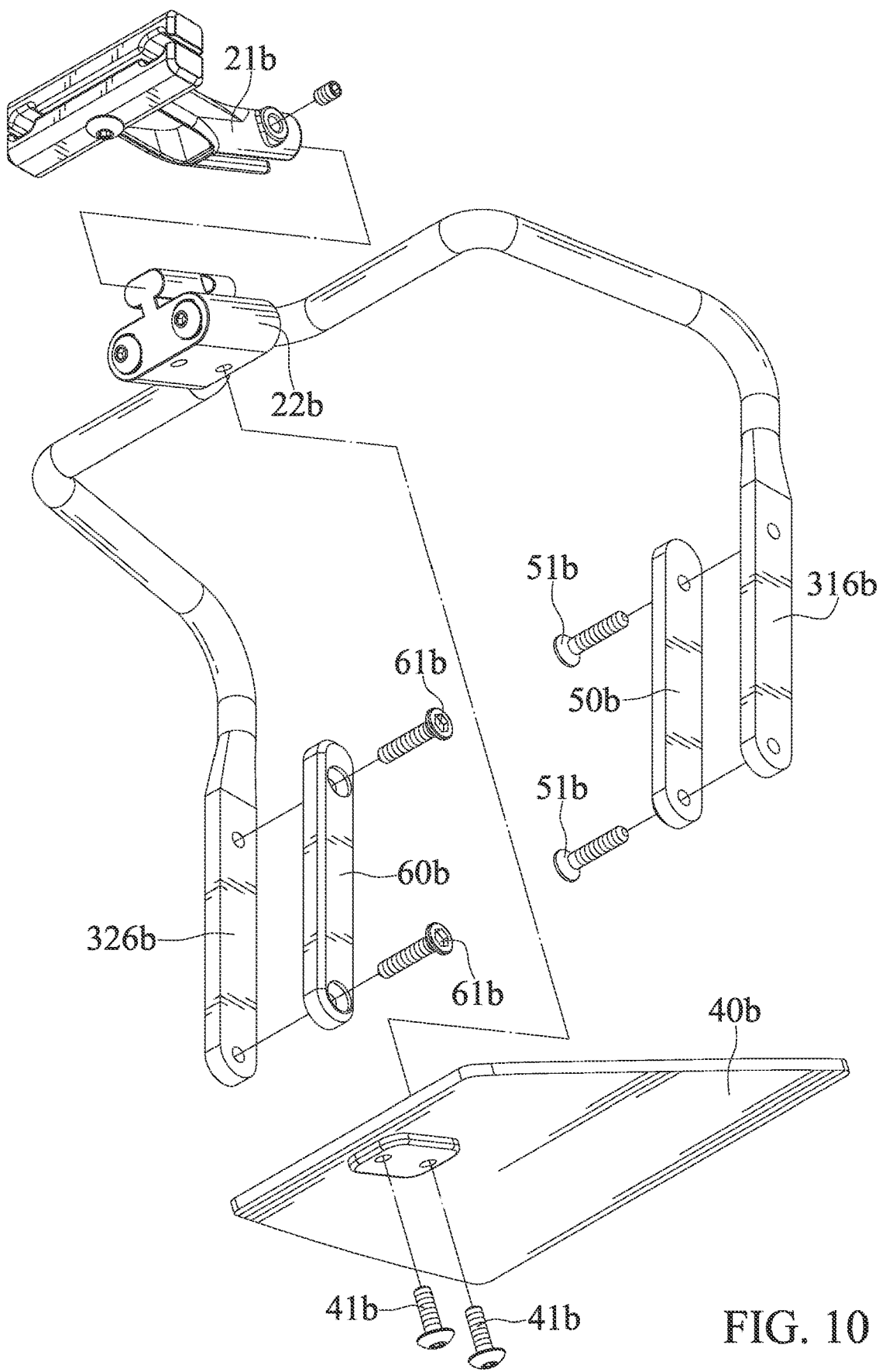
FIG. 10 is an exploded, perspective view of the auxiliary fixing device of the third embodiment according to the present invention.
Figure 11:
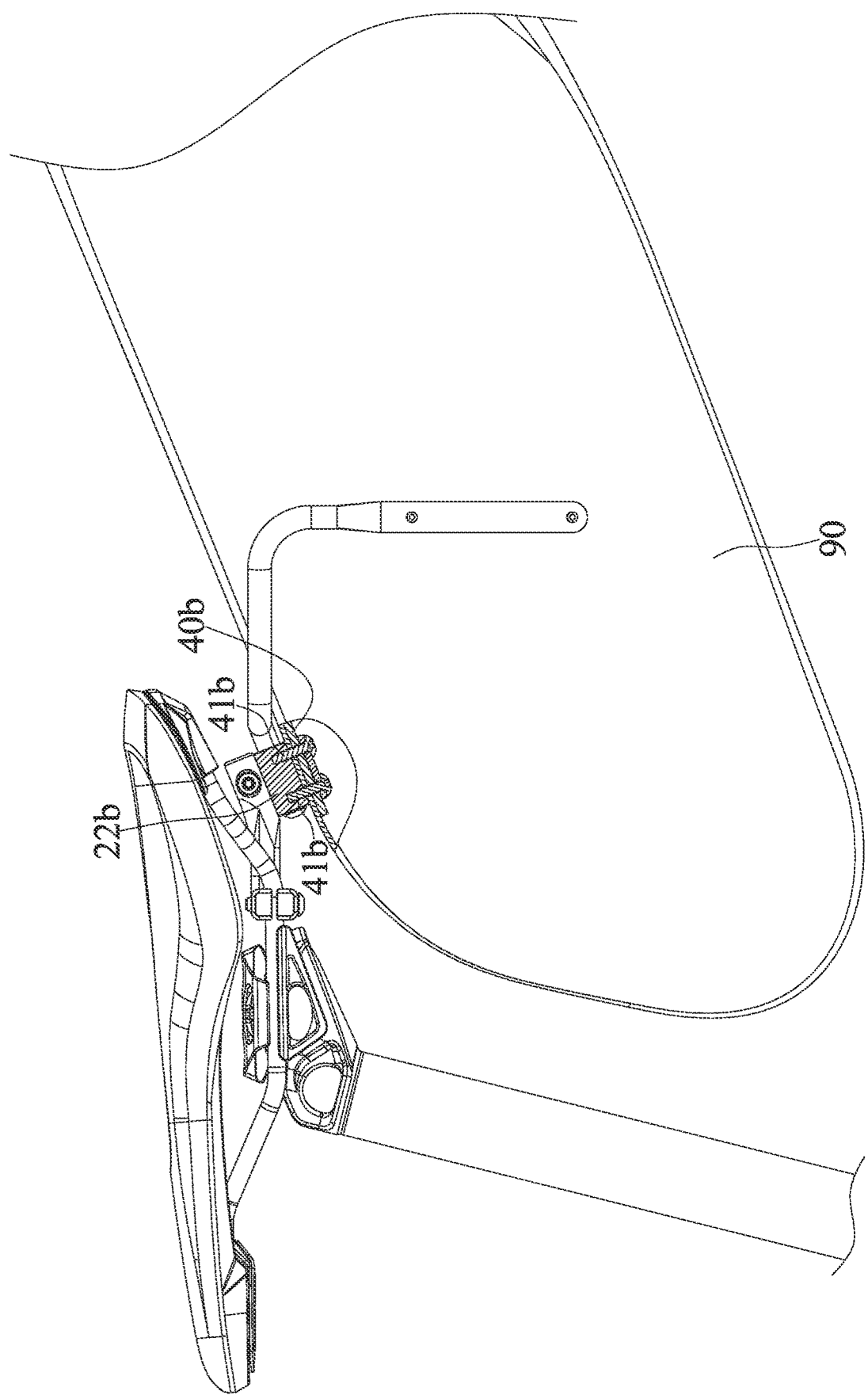
FIG. 11 is a diagrammatic view illustrating use of the auxiliary fixing device of the third embodiment according to the present invention on a bicycle.
Figure 12:
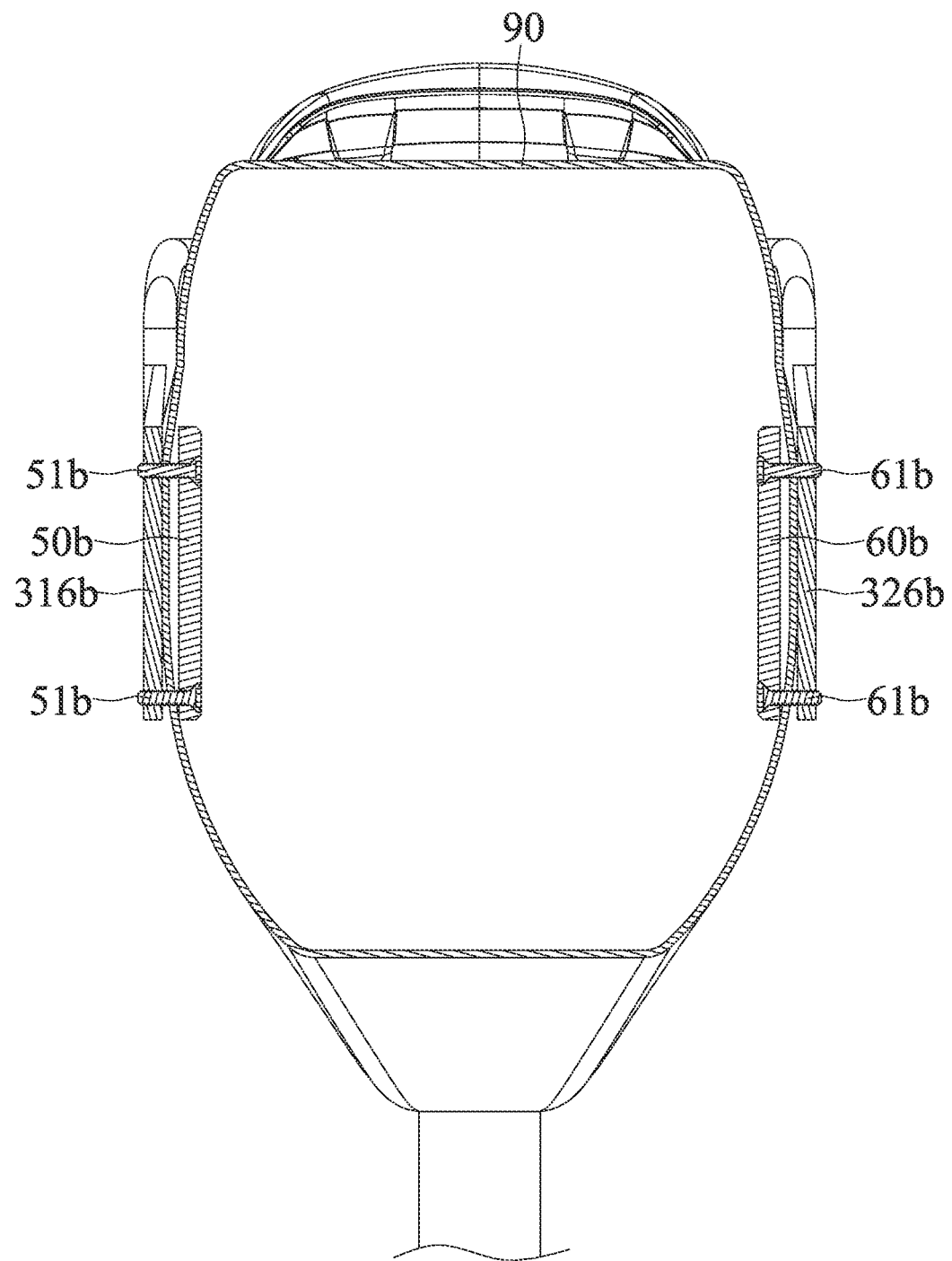
FIG. 12 is a cross sectional view illustrating use of the auxiliary fixing device of the third embodiment according to the present invention on the bicycle.

FIGS. 6-8 show an auxiliary fixing device of a second embodiment according to the present invention. The second embedment is substantially the same as the first embodiment. The main differences are that the fixing device 10a includes a top clamping board 40a fixed to a side of the connecting member 22a opposite to the base 21a by a plurality of top fasteners 41a. In this embodiment, the plurality of top fasteners 41a extends through the top clamping board 40a from a side of the top clamping board 40a opposite to the connecting member 22a and is in threading connection with the connecting member 22a.

The top clamping board 40a can be mounted in the saddle bag 90. The plurality of top fasteners 41a can secure the saddle bag 90 to the connecting member 22a.

FIGS. 9-12 show an auxiliary fixing device of a third embodiment according to the present invention. The third embedment is substantially the same as the first embodiment. The main differences are that the fixing device 10b includes a top clamping board 40b, a first side clamping board 50b, and a second side clamping board 60b. The top clamping board 40b is fixed to a side of the connecting member 22b opposite to the base 21b by a plurality of top fasteners 41b. The first side clamping board 50b is fixed by a plurality of first side fasteners 51b to a side of the second section 316b adjacent to the fourth section 326b. The second side clamping board 60b is fixed by a plurality of second side fasteners 61b to a side of the fourth section 326b adjacent to the second section 316b.

In this embodiment, the plurality of top fasteners 41b extends through the top clamping board 40b from a side of the top clamping board 40b opposite to the connecting member 22b and is in threading connection with the connecting member 22b. In this embodiment, the plurality of first side fasteners 51b extends through the first side clamping board 50b from a side of the first side clamping board 50b opposite to the second section 316b and is in threading connection with the second section 316b. In this embodiment, the plurality of second side fasteners 61b extends through the second side clamping board 60b from a side of the second side clamping board 60b opposite to the fourth section 326b and is in threading connection with the fourth section 326b.

The top clamping board 40b, the first side clamping board 50b, and the second side clamping board 60b can be mounted in the saddle bag 90. The plurality of top fasteners 41b can secure the saddle bag 90 to the connecting member 22b. The plurality of first side fasteners 51b can secure the saddle bag 90 to the second section 316b. The plurality of second side fasteners 61b can secure the saddle bag 90 to the fourth section 326b.

Although specific embodiments have been illustrated and described, numerous modifications and variations are still possible without departing from the scope of the invention. The scope of the invention is limited by the accompanying claims.

The invention claimed is:

1. An auxiliary fixing device for a bicycle, comprising:
a body adapted to attach to a saddle frame of a bicycle, wherein the body includes a base and a connecting member, wherein the base includes an end having a sliding groove, wherein the connecting member includes a sliding portion on a side thereof and first and second insertion holes extending therethrough, wherein the sliding portion is inserted into the sliding groove; and
a supporting rod unit including a first supporting rod and a second supporting rod, wherein the first supporting rod includes a first connecting portion, a first supporting portion, and a first extension portion, wherein the first connecting portion is inserted into the first insertion hole, wherein the first extension portion is located between the first connecting portion and the first supporting portion, wherein the second supporting rod includes a second connecting portion, a second supporting portion, and a second extension portion, wherein the second connecting portion is inserted into the second insertion hole, wherein the second extension portion is located between the second connecting portion and the second supporting portion, wherein an end of the first extension portion is adjacent to the first connecting portion, wherein another end of the first extension portion extends away from the second supporting rod, wherein an end of the second extension portion is adjacent to the second connecting portion, wherein another end of the second extension portion extends away from the first supporting rod,
wherein the first supporting portion includes a first section, a second section, and a first bend section, wherein the first section is adjacent to the first extension portion, wherein the first bend section is disposed between the first section and the second section, wherein the second supporting portion includes a third section, a fourth section, and a second bend section, wherein the third section is adjacent to the second extension portion, wherein the second bend section is disposed between the third section and the fourth section, wherein the first section and the third section have a spacing therebetween that increases with increasing distance from the body, and wherein the second section is parallel to the fourth section,
wherein each of the first connecting portion and the first insertion hole includes non-circular cross sections, wherein the first supporting rod is not rotatable relative to the connecting member, wherein a first fastener is disposed to the first supporting rod and is secured to an end of the first connecting portion, wherein the first fastener and the first extension portion are disposed on two opposite sides of the connecting member, wherein each of the second connecting portion and the second insertion hole includes non-circular cross sections, wherein the second supporting rod is not rotatable relative to the connecting member, wherein a second fastener is disposed to the second supporting rod and is secured to an end of the second connecting portion, and wherein the second fastener and the second extension portion are disposed on two opposite sides of the connecting member,
wherein the base includes a lateral hole extending in a radial direction of the sliding groove, wherein the lateral hole intercommunicates with the sliding groove, wherein a threaded member is mounted in the lateral hole, wherein the sliding portion includes a threaded aperture, and wherein the threaded member is threadedly inserted into the threaded aperture.

2. The auxiliary fixing device for the bicycle as claimed in claim 1, wherein the first connecting portion is parallel to the second connecting portion, wherein the first connecting portion and the first extension portion have a bend therebetween and extend in different directions, and wherein the second connecting portion and the second extension portion have a bend therebetween and extend in different directions.

3. The auxiliary fixing device for the bicycle as claimed in claim 2, wherein the body includes a saddle frame clamping block mounted to an end of the base opposite to the supporting rod unit, wherein the end of the base opposite to the supporting rod unit includes two first grooves through which a saddle frame extends, wherein the saddle frame clamping block includes two second grooves through which the saddle frame extends and aligned with the two first grooves, respectively, wherein the sliding groove includes an inner periphery having T-shaped cross sections, and wherein the sliding portion includes an outer periphery having T-shaped cross sections.

4. An auxiliary fixing device for the bicycle, comprising:
a body adapted to attach to a saddle frame of a bicycle, wherein the body includes a base and a connecting member, wherein the base includes an end having a sliding groove, wherein the connecting member includes a sliding portion on a side thereof and first and second insertion holes extending therethrough, wherein the sliding portion is inserted into the sliding groove; and
a supporting rod unit including a first supporting rod and a second supporting rod, wherein the first supporting rod includes a first connecting portion, a first supporting portion, and a first extension portion, wherein the first connecting portion is inserted into the first insertion hole, wherein the first extension portion is located between the first connecting portion and the first supporting portion, wherein the second supporting rod includes a second connecting portion, a second supporting portion, and a second extension portion, wherein the second connecting portion is inserted into the second insertion hole, wherein the second extension portion is located between the second connecting portion and the second supporting portion, wherein an end of the first extension portion is adjacent to the first connecting portion, wherein another end of the first extension portion extends away from the second supporting rod, wherein an end of the second extension portion is adjacent to the second connecting portion, wherein another end of the second extension portion extends away from the first supporting rod,
wherein the first supporting portion includes a first section, a second section, and a first bend section, wherein the first section is adjacent to the first extension portion, wherein the first bend section is disposed between the first section and the second section, wherein the second supporting portion includes a third section, a fourth section, and a second bend section, wherein the third section is adjacent to the second extension portion, wherein the second bend section is disposed between the third section and the fourth section, wherein the first section and the third section have a spacing therebetween that increases with increasing distance from the body, and wherein the second section is parallel to the fourth section,
wherein the fixing device includes a top clamping board fixed to a side of the connecting member opposite to the base by a plurality of top fasteners, wherein the plurality of top fasteners extends through the top clamping board from a side of the top clamping board opposite to the connecting member and is in threading connection with the connecting member.

5. The auxiliary fixing device for the bicycle as claimed in claim 4, wherein the fixing device includes a first side clamping board and a second side clamping board, wherein the first side clamping board is fixed by a plurality of first side fasteners to a side of the second section adjacent to the fourth section, and wherein the second side clamping board is fixed by a plurality of second side fasteners to a side of the fourth section adjacent to the second section.

6. The auxiliary fixing device for the bicycle as claimed in claim 5, wherein the plurality of top fasteners extends through the top clamping board from a side of the top clamping board opposite to the connecting member and is in threading connection with the connecting member, wherein the plurality of first side fasteners extends through the first side clamping board from a side of the first side clamping board opposite to the second section and is in threading connection with the second section, and wherein the plurality of second side fasteners extends through the second side clamping board from a side of the second side clamping board opposite to the fourth section and is in threading connection with the fourth section.

* * * * *